(12) United States Patent
Campbell et al.

(10) Patent No.: US 7,742,770 B2
(45) Date of Patent: Jun. 22, 2010

(54) METHOD AND APPARATUS FOR IMPROVED ANTENNA ISOLATION FOR PER-ANTENNA TRAINING USING VARIABLE SCALING

(75) Inventors: Edward E. Campbell, Blandon, PA (US); Syed A. Mujtaba, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 1019 days.

(21) Appl. No.: 11/388,294

(22) Filed: Mar. 24, 2006

(65) Prior Publication Data

US 2007/0224946 A1    Sep. 27, 2007

(51) Int. Cl.
*H04W 72/00* (2009.01)

(52) U.S. Cl. .................... 455/450; 455/458; 375/260; 375/267

(58) Field of Classification Search ................. 455/502, 455/66.1, 101, 103, 458, 82, 83, 84, 88, 78, 455/63.1, 67.11, 450; 375/260, 267
See application file for complete search history.

(56) References Cited

U.S. PATENT DOCUMENTS

| | | | |
|---|---|---|---|
| 2005/0035885 A1 | 2/2005 | Hosur et al. | |
| 2005/0169397 A1* | 8/2005 | Goel et al. | 375/267 |
| 2005/0233709 A1 | 10/2005 | Gardner et al. | |
| 2005/0276347 A1 | 12/2005 | Mujtaba et al. | |
| 2006/0140290 A1* | 6/2006 | Li et al. | 375/260 |

FOREIGN PATENT DOCUMENTS

WO    WO 02/098088 A1    12/2002
WO    WO 2005/006588 A2    1/2005

OTHER PUBLICATIONS

Campbell et al., "Method and Apparatus for Improved Antenna Isolation for Per-Antenna Training Using Transmit/Receive Switch," U.S. Appl. No. 11/388,330, filed Mar. 24, 2006.

* cited by examiner

*Primary Examiner*—Lana N Le
*Assistant Examiner*—Ping Y Hsieh
(74) *Attorney, Agent, or Firm*—Ryan, Mason & Lewis, LLP

(57) ABSTRACT

Methods and apparatus are provided for per-antenna training in a multiple antenna communication system having a plurality of transmit antenna branches. A long training sequence is transmitted on each of the transmit antenna branches such that only one of the transmit antenna branches is active at a given time. The active transmit antenna branch transmits the long training sequence with an increased power level relative to a transmission of a payload by the active transmit antenna branch. The increased power level for the active transmit antenna branch compensates for the inactive transmit antenna branches being silent during the given time. Thus, the active transmit antenna branch provides approximately the same antenna power while transmitting the long training sequence as a total power of the plurality of transmit antenna branches during a transmission of the payload. The increased power level can be provided, for example, by a digital-to-analog converter associated with the active transmit antenna branch.

20 Claims, 5 Drawing Sheets

METHOD AND APPARATUS FOR IMPROVED ANTENNA ISOLATION FOR PER-ANTENNA TRAINING USING VARIABLE SCALING

CROSS REFERENCE TO RELATED APPLICATIONS

The present application is related to United States patent application, entitled "Method and Apparatus for Improved Antenna Isolation for Per-Antenna Training Using Transmit/Receive Switch," filed contemporaneously herewith and incorporated by reference herein.

FIELD OF THE INVENTION

The present invention relates generally to multiple antenna wireless communication systems, and more particularly, to preamble training techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire the channel matrix through training. This is generally achieved by using a specific training symbol, or preamble, to perform synchronization and channel estimation. It is desirable for multiple antenna communication systems to co-exist with legacy single antenna communications systems (typically referred to as Single Input Single Output (SISO) systems). Thus, a legacy (single antenna) communications system must be able to interpret the preambles that are transmitted by multiple antenna communication systems. Most legacy Wireless Local Area Network (WLAN) systems based upon OFDM modulation comply with either the IEEE 802.11a or IEEE 802.11g standards (hereinafter "IEEE 802.11a/g"). Generally, the preamble signal seen by the legacy device should allow for accurate synchronization and channel estimation for the part of the packet that the legacy device needs to understand. Previous MIMO preamble formats have reused the legacy training preamble to reduce the overhead and improve efficiency. Generally, the proposed MIMO preamble formats include the legacy training preamble and additional long training symbols, such that the extended MIMO preamble format includes at least one long training symbol for each transmit antenna or spatial stream.

A number of frame formats have been proposed for evolving multiple antenna communication systems, such as MIMO-OFDM systems. Existing frame formats provide inaccurate estimations for the MIMO systems, such as inaccurate power measurement or outdated frequency offset and timing offset information, or fail to provide full backwards compatibility to the legacy devices of some vendors. In one proposed MIMO frame format associated with the 802.11n standard, each transmit antenna sequentially transmits one or more long training symbols (LTS), such that only one transmit antenna is active at a time. Such a per-antenna training scheme requires sufficient transmit antenna isolation in the PHY architecture for MIMO channel estimation during the long training sequence. Thus, while the active antenna is transmitting, the remaining transmit antennas must be "silent" for the receiver to properly obtain the channel coefficients from the received signals. Proper isolation of one antenna and its transmitter chain to another is critical to avoid excessive RF leakage onto the "silent" transmitters, resulting in corrupted channel estimation from the desired transmitter.

In one prior isolation technique, the "silent" transmit antenna chains (typically comprising a digital signal processor, RF transceiver and power amplifier) were switched on and off. Such switching of the antenna chains, however, will cause the temperature of the corresponding power amplifier to increase and decrease, respectively. Generally, such heating and cooling of the power amplifier will lead to "breathing" effects that cause the transmitted signal to have a phase or magnitude offset, relative to the desired signal. In addition, turning off the antenna chain may also cause glitches in the voltage controlled oscillator (VCO) in the RF transceiver as well as excessive delays due to the start-up time of the power amplifiers.

A need therefore exists for methods and systems for performing channel estimation and training in a MIMO-OFDM system with improved antenna isolation.

SUMMARY OF THE INVENTION

Generally, methods and apparatus are provided for per-antenna training in a multiple antenna communication system having a plurality of transmit antenna branches. According to one aspect of the invention, a long training sequence is transmitted on each of the transmit antenna branches such that only one of the transmit antenna branches is active at a given time. The active transmit antenna branch transmits the long training sequence with an increased power level relative to a transmission of a payload by the active transmit antenna branch.

The increased power level for the active transmit antenna branch compensates for the inactive transmit antenna branches being silent during the given time. Thus, the active transmit antenna branch provides approximately the same antenna power while transmitting the long training sequence as a total power of the plurality of transmit antenna branches during a transmission of the payload. The increased power level can be provided, for example, by a digital-to-analog converter associated with the active transmit antenna branch.

According to another aspect of the invention, a digital code corresponding to a binary value of zero is optionally applied to one or more digital-to-analog converters associated with the inactive transmit antenna branches, for additional isolation. The long training sequences can be used for MIMO channel estimation. In addition, short training sequences can optionally be transmitted substantially simultaneously on each of the transmit antennas.

A more complete understanding of the present invention, as well as further features and advantages of the present invention, will be obtained by reference to the following detailed description and drawings.

DETAILED DESCRIPTION

The present invention provides per-antenna techniques for preamble training for MIMO systems with improved antenna isolation. According to one aspect of the invention, a MIMO "per-antenna-training" preamble algorithm is disclosed that uses an antenna transmit/receive RF Switch to provide improved isolation of the "silent" antennas from the active antenna transmitting the long training sequence. According to another aspect of the invention, a MIMO "per-antenna-training" preamble algorithm is disclosed that uses variable scaling of OFDM symbols in the digital signal processor to give the digital-to-analog converters sufficient dynamic baseband signal power range for transmitting individual, higher power LTS. Generally, as discussed further below in conjunction with FIGS. 4 and 5, the power level of the active transmitter is increased during transmission of the LTS to compensate for the fact that the inactive transmitters are silent during this interval.

Figure 1:
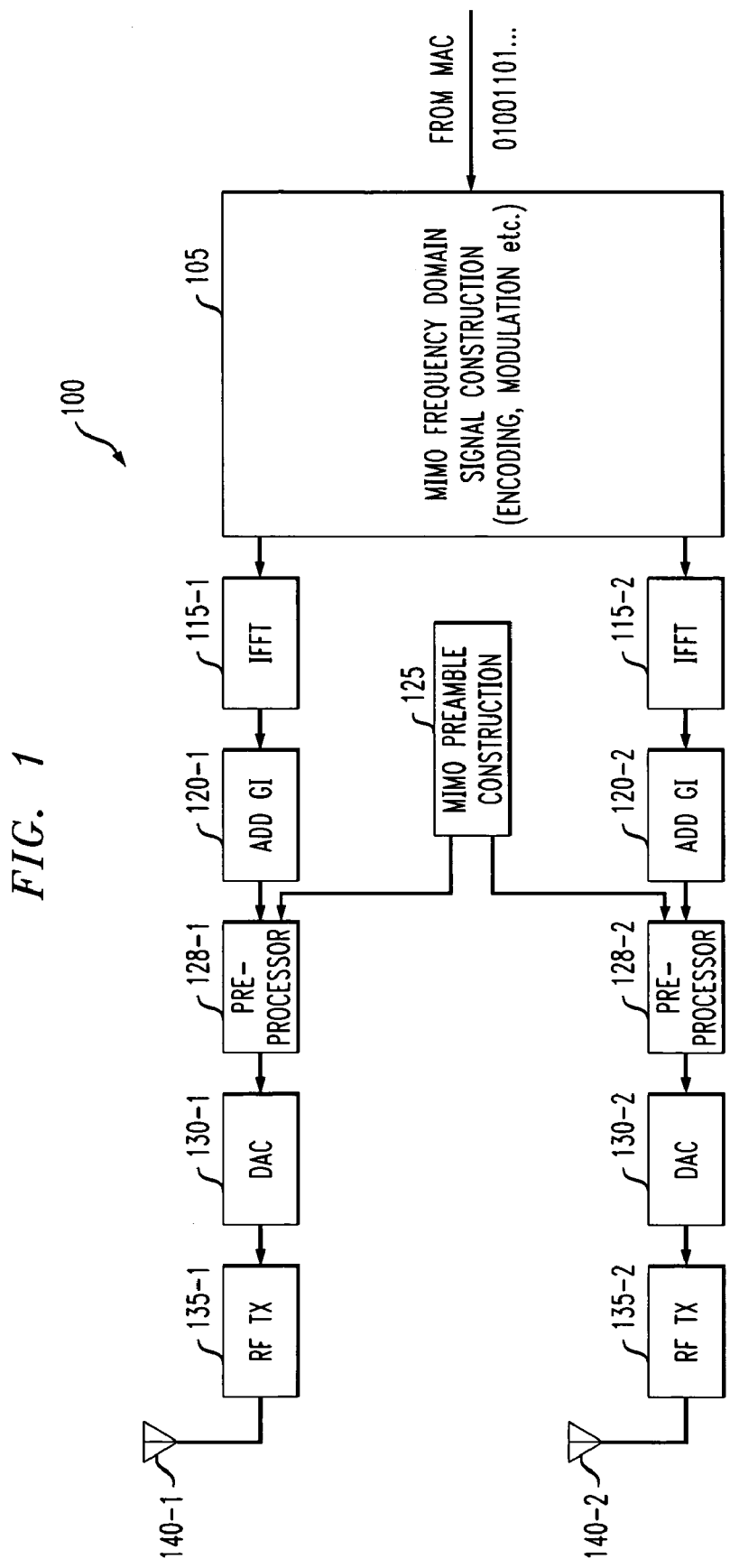
FIG. 1 is a schematic block diagram of an exemplary MIMO transmitter.

FIG. 1 is a schematic block diagram of a MIMO transmitter 100. As shown in FIG. 1, the exemplary two antenna transmitter 100 encodes the information bits received from the medium access control (MAC) layer and maps the encoded bits to different frequency tones (subcarriers) at stage 105. For each transmit branch, the signal is then transformed to a time domain wave form by an IFFT (inverse fast Fourier transform) 115. A guard interval (GI) of 800 nanoseconds (ns) is added in the exemplary implementation before every OFDM symbol by stage 120 and a preamble of 32 µs is added by stage 125 to complete the packet. The digital signal is then pre-processed at stage 128 and converted to an analog signal by converter 130 before the RF stage 135 transmits the signal on a corresponding antenna 140.

Figure 2:
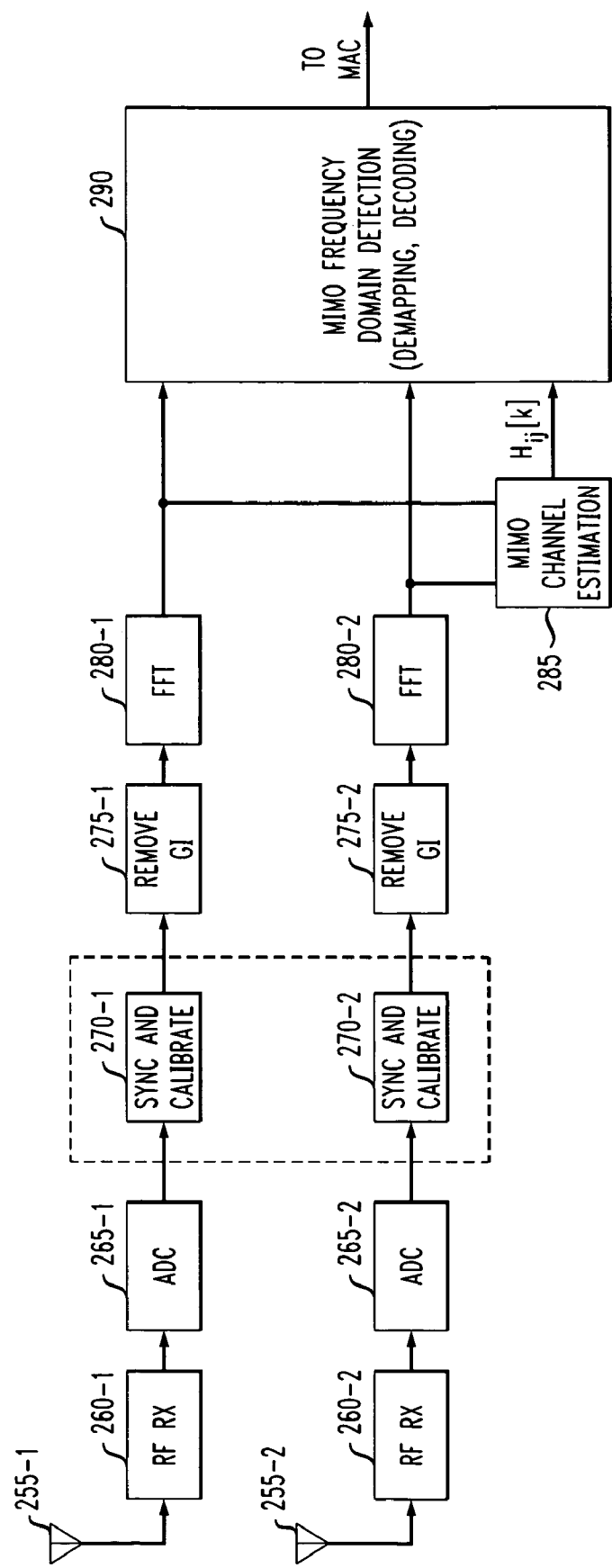
FIG. 2 is a schematic block diagram of an exemplary MIMO receiver.

FIG. 2 is a schematic block diagram of a MIMO receiver 200. As shown in FIG. 2, the exemplary two antenna receiver 200 processes the signal received on two receive antennas 255-1 and 255-2 at corresponding RF stages 260-1, 260-2. The analog signals are then converted to digital signals by corresponding converters 265. The receiver 200 processes the preamble to detect the packet, and then extracts the frequency and timing synchronization information at synchronization stage 270 for both branches. The guard interval (GI) is removed at stage 275. The signal is then transformed back to the frequency domain by an FFT at stage 280. The channel estimates are obtained at stage 285 using the long training symbol. The channel estimates are applied to the demapper/decoder 290, and the information bits are recovered.

Figure 3:
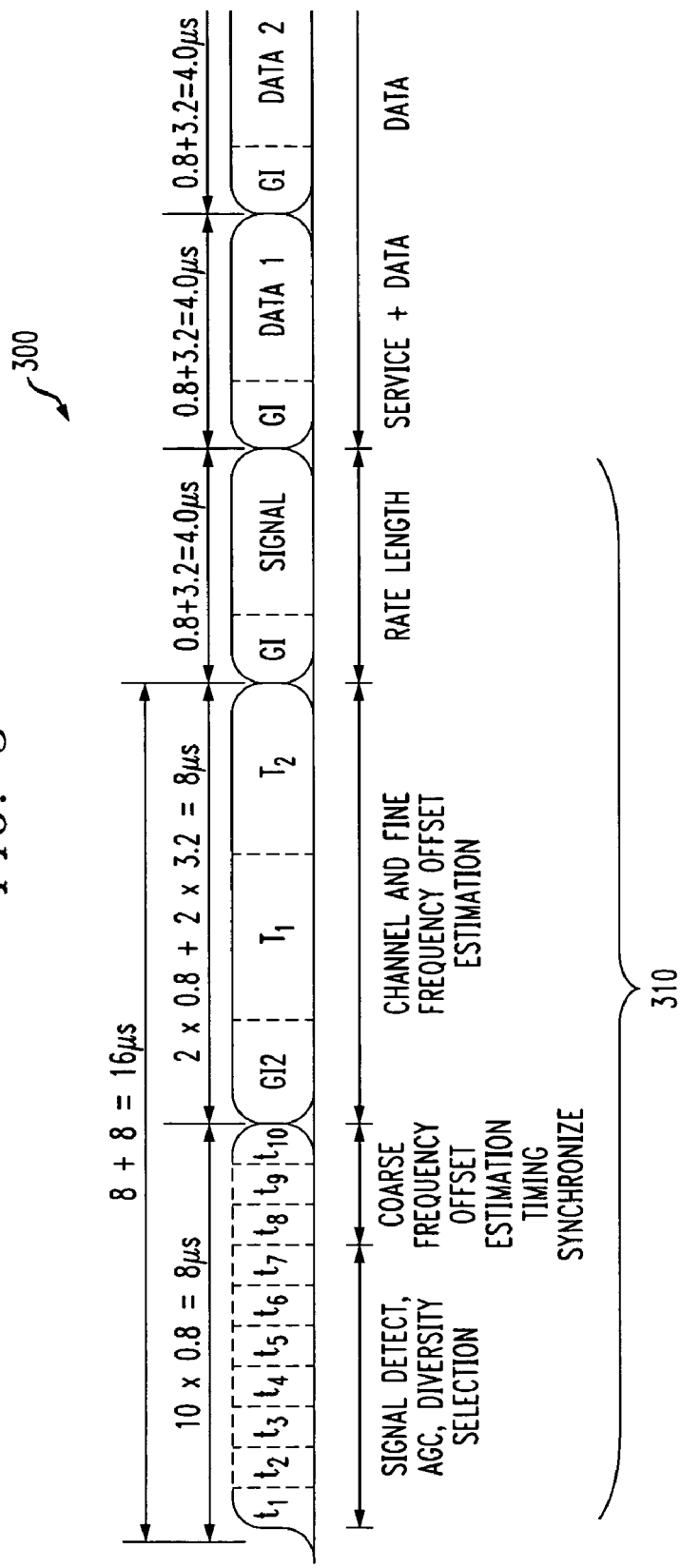
FIG. 3 illustrates a frame format in accordance with the IEEE 802.11a/g standards.

FIG. 3 illustrates a frame format 300 in accordance with the IEEE 802.11a/g standards. As shown in FIG. 3, the frame format 300 comprises ten short training symbols, t1 to t10, collectively referred to as the Short Preamble. Thereafter, there is a Long Preamble, consisting of a protective Guard Interval (GI) and two Long Training Symbols, T1 and T2. A SIGNAL field is contained in the first information bearing OFDM symbol, and the information in the SIGNAL field is needed to transmit general parameters such as packet length and data rate. The Short Preamble, Long Preamble and Signal field comprise a legacy header 310. The OFDM symbols carrying the DATA follows the SIGNAL field.

The preamble includes two parts, the training part and the signal field. The training part allows the receiver 200 to perform packet detection, power measurements for automatic gain control (AGC), frequency synchronization, timing synchronization and channel estimation. The signal field is going to be transmitted in the lowest rate and gives information, for example, on data rate and packet length. In the MIMO system, the signal field should also indicate the number of spatial streams and the number of transmit antennas 140.

The receiver 200 uses the preamble to get all the above information in the preamble. Based on this information, when the data arrives, the receiver 200 removes the GI and transforms the data into the frequency domain using FFT, de-interleaves and decodes the data.

As previously indicated, in a MIMO system, besides these functions, it is also preferred that the preamble be backwards compatible with the legacy 802.11a/g devices, i.e., the legacy device should be able to get correct information about the duration of the packet so that it can backoff correctly and does not interrupt the MIMO HT transmission.

An exemplary frame format incorporating features of the present invention is as discussed further below in conjunction with FIG. 5.

Antenna Isolation for Per-Antenna Training

As previously indicated, the long training sequence (LTS) in the preamble is used during channel estimation to obtain the m-TX by n-RX channel coefficients from each individual transmit antenna to each of n-receive antennas. The other transmit antennas must be silent when the active transmit antenna is transmitting the long training sequence. For example, the inactive antennas can be considered to be "silent" as long as the power of the inactive antennas is reduced by 30 dB, relative to the active antenna.

According to one aspect of the invention, a MIMO "per-antenna-training" preamble algorithm is disclosed that uses an antenna transmit/receive RF Switch to provide improved isolation of the "silent" antennas from the active antenna transmitting the long training sequence. According to another aspect of the invention, a MIMO "per-antenna-training" preamble algorithm is disclosed that uses variable scaling of the OFDM symbols in the digital signal processor to give the digital-to-analog converters sufficient dynamic baseband signal power range for transmitting individual, higher power LTS. Generally, as discussed further below in conjunction with FIGS. 4 and 5, the power level of the active transmitter is increased during transmission of the LTS to compensate for the fact that the inactive transmitters are silent during this interval.

In a further variation, a 0-code can optionally be applied to the digital-to-analog converter(s) in the transmit antenna chain for the silent antennas. In this manner, the RF transceiver and power amplifier can remain turned on during the silent period. This will avoid VCO glitching problems and extra power amplifier start-up transients.

Figure 4:
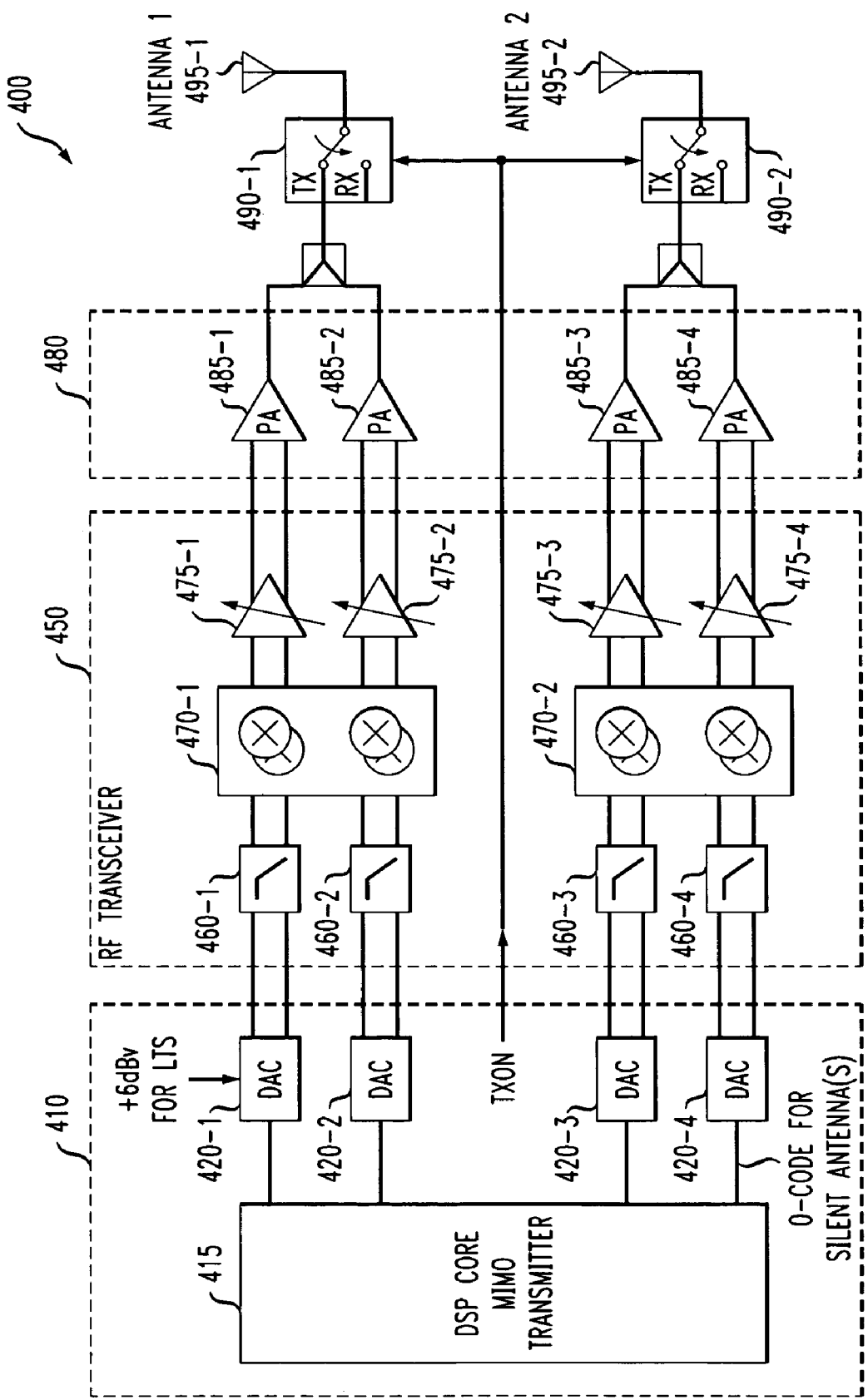
FIG. 4 is a schematic block diagram of an exemplary 2×2 MIMO transceiver incorporating features of the present invention.

FIG. 4 is a schematic block diagram of an exemplary 2×2 MIMO transceiver 400 incorporating features of the present invention. As shown in FIG. 4, the exemplary transceiver 400 comprises a baseband chip 410, an RF transceiver 450 and a power amplifier chip 480. The baseband chip 410 is comprised of a digital signal processor 415 and a number of digital-to-analog converters 420-1 through 420-4 (hereinafter, collectively referred to as digital-to-analog converters 420). The digital signal processor 415 generates the digital values to be transmitted, in a known manner. The digital-to-analog converters 420 convert the digital values into analog values for transmission. During transmission of the long training sequence, the DSP 415 generates the digital value corresponding to the long training sequence for the active antenna and generates a 0-code to be applied to the digital-to-analog converter(s) 420 for the silent transmit antennas. Applying a 0-code to the digital-to-analog converter(s) 420 for the silent transmit antennas significantly reduces the RF power out of the power amplifiers 485, discussed below. In the exemplary two antenna embodiment shown in FIG. 4, the first antenna 490-1 is active, while the second antenna 490-2 is silent.

In addition, as discussed further below, the DSP 415 generates a control signal TXON that controls the position of a transmit/receive switch 490 associated with each antenna branch.

The exemplary RF transceiver 450 is comprised of low pass filters 460-1 through 460-4, mixers 470-1 and 470-2, and drivers 475-1 through 475-4. The RF transceiver 450 operates in a conventional manner. Generally, in the exemplary embodiment of FIG. 4, the digital-to-analog converters 420 generate in-phase (I) and quadrature (Q) signals that are applied to the low pass filters 460-1 through 460-4. The filtered signals are applied to dual band mixers (such as 2.4 GHz and 5 GHz). The drivers associated with each antenna branch then operate in an associated band. For example, driver 475-1 can operate in a 2.4 GHz band and driver 475-2 can operate in a 5 GHz band. Likewise, driver 475-3 can operate in a 2.4 GHz band and driver 475-4 can operate in a 5 GHz band.

The power amplifier chip 480 is comprised of a number of power amplifiers 485-1 through 485-4 that can operate in a conventional manner. The output of the power amplifiers 485-1 and 485-2 are applied to a transmit/receive switch 490-1 associated with the first antenna branch and the output of the power amplifiers 485-3 and 485-4 are applied to a transmit/receive switch 490-2 associated with the second antenna branch.

Generally, when in a transmit mode, the transmit/receive switches 490 are configured to couple the corresponding power amplifiers 485 to the corresponding antenna 495. Likewise, when in a receive mode, the transmit/receive switches 490 are configured to couple the corresponding antenna 495 to the appropriate decode circuitry (not shown), in a known manner.

According to one aspect of the invention, the transmit/receive switches 490 are used to improve the isolation of the "silent" antenna(s) from the active antenna transmitting the long training sequence for MIMO "per-antenna-training." In particular, the transmit/receive switch 490 for the active antenna transmitting the long training sequence is configured in a transmit mode, while the transmit/receive switch(es) 490 for the silent antenna(s) are configured in a receive mode. In other words, the antenna switch 490 for the silent transmitter(s) connects the respective antenna port to the receiver input port. As indicated above, in an exemplary embodiment, the DSP 415 generates a control signal TXON that controls the position of the transmit/receive switches 490 associated with each antenna branch to implement this feature of the present invention.

According to another aspect of the invention, variable scaling of the OFDM symbols is employed in the digital signal processor to give the digital-to-analog converters sufficient dynamic baseband signal power range for transmitting an individual, higher power LTS. As indicated above, the power level of the active transmitter is increased during transmission of the LTS to compensate for the fact that the inactive transmitters are silent during this interval. The present invention thus recognizes that in a per-antenna training implementation, the single active MIMO transmitter is essentially acting in a Single Input Single Output (SISO) mode. Thus, the single active MIMO transmitter must provide approximately the same antenna power while transmitting the LTS as the total MIMO power during the OFDM data symbol payload. For the exemplary 2-TX×2-RX MIMO system of FIG. 4, this requires the active transmitter to transmit the LTS with 3 dB higher power.

Similarly, for a 4-TX×4-RX MIMO system, this requires the active transmitter to transmit the LTS with 6 dB higher power. Thus, the digital-to-analog converters 420 for the active chain have an output signal level for transmitting the LTS that this-is +6 dB higher than employed for transmitting other fields. When the output power level of the digital-to-analog converters 420 is 6 dB higher, the antenna power is therefore 6 dB higher as well. The DACs for the "silent" transmitter are at 0-code. The variable scaling of the LTS transmission is seen most clearly in FIG. 5, discussed hereinafter.

Similarly, for a 4-TX×4-RX MIMO system, this requires the active transmitter to transmit the LTS with 6 dB higher power. Thus, the digital-to-analog converters 420 for the active chain have an output signal level for transmitting the LTS this is +6 dB higher than employed for transmitting other fields. When the output power level of the digital-to-analog converters 420 is +6 dB higher, the antenna power is therefore 6 dB higher as well. The DACs for the "silent" transmitter are at 0-code. The variable scaling of the LTS transmission is seen most clearly in FIG. 5, discussed hereinafter.

In one implementation, the digital signal processor 415 has digital variable scaling of the average power of the OFDM symbols to give the baseband output signal of the digital-to-analog converters 420 a variable range of, for example, $10*\log(m)$ dB, where m equals the number of MIMO transmit antennas (TX). In this manner, a fast but stable power ramp up/down is provided without the power amplifier gain step transient and bias settling time issues associated with prior techniques. Also, an accurate antenna power step is obtained without additional power control range or complexity needed for the RF transceiver 450.

The LTS has a lower modulated signal Peak-to-Average Power Ratio (PAPR) than the MIMO OFDM data symbols. Thus, the overall PHY transmitter architecture of FIG. 4 has sufficient linearity to transmit the LTS with higher average power in a SISO mode for per-antenna training with less back-off from the saturated power level. This allows the average output of the digital-to-analog converters 420 to be $10*\log(m)$ dB larger for the LTS.

Figure 5:
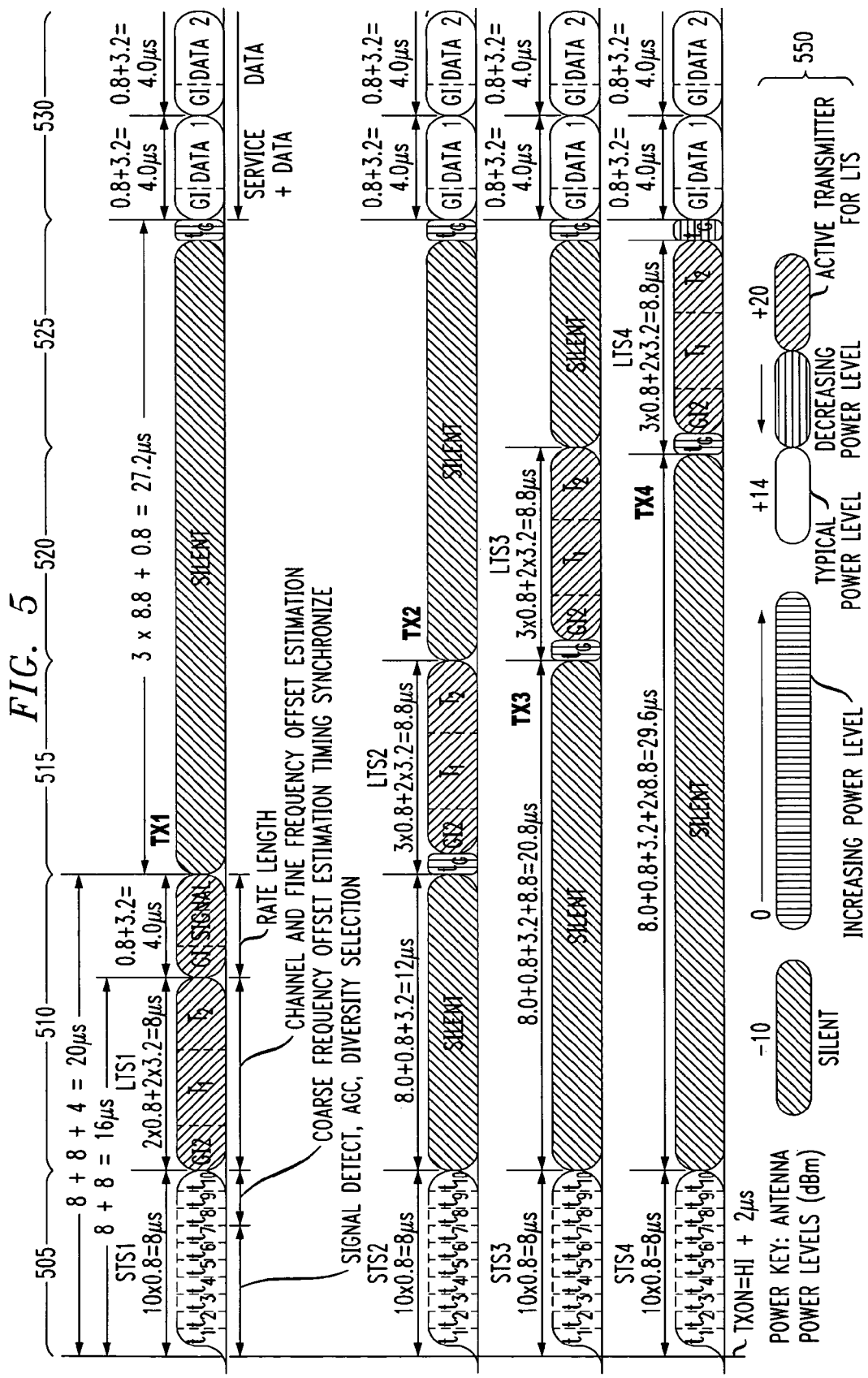
FIG. 5 illustrates an exemplary preamble format and power design for an exemplary 4×4 MIMO system incorporating features of the present invention.

FIG. 5 illustrates an exemplary preamble format and power design for an exemplary 4×4 MIMO system incorporating features of the present invention. As shown in FIG. 5, all four transmitters TX1-TX4 are simultaneously active for transmission of the short training sequence (STS) during an interval 505. Based on the key 550 shown in FIG. 5, each transmitter TX1-TX4 is transmitting the STS with a typical power level of +14 dBm in the exemplary embodiment. At the beginning of the STS interval 505, the control signal, TXON, for the transmit/receive switches 490 is activated to put all transmit branches TX1-TX4 in a transmit mode. In addition, a 2 microsecond delay allows the power amplifiers to ramp up until the digital-to-analog converters 420 start generating the STS symbols.

Thereafter, the LTS is transmitted by each transmitter in a per-antenna manner, as described above. Thus, a first active transmitter TX1 transmits the LTS during an interval 510, while the other transmitters TX2-TX4 are silent. The active transmitter TX1 transmits the LTS with an increased power level of 20 dBm in accordance with the invention. Meanwhile, the silent transmitters TX2-TX4 transmit with a power level of −10 dBm or less during the silent mode. During interval 510, the control signals, TXON, for each of the transmit/receive switches 490 is controlled to put the first transmit branch TX1 in a transmit mode, and the remaining transmit branches TX2-TX4 in a receive mode.

During a second LTS interval 515, the second transmitter TX2 is active and transmits the LTS with an increased power level of 20 dBm, while the other transmitters TX1, TX3, TX4 are silent with a power level of −10 dBm or less during the silent mode. During a third LTS interval 520, the third transmitter TX3 is active and transmits the LTS with an increased power level of 20 dBm, while the other transmitters TX1, TX2, TX4 are silent with a power level of −10 dBm or less during the silent mode. During a fourth LTS interval 525, the fourth transmitter TX4 is active and transmits the LTS with an increased power level of 20 dBm, while the other transmitters TX1, TX2, TX3 are silent with a power level of −10 dBm or less during the silent mode.

Finally, after the MIMO preamble is completed, all transmitter TX1-TX4 transmit the data symbols during interval 530 with a proper backoff (i.e., using the typical power level of +14 dBm).

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for per-antenna training in a multiple antenna communication system having a plurality of transmit antenna branches, said method comprising the step of:
   transmitting a long training sequence on each of said transmit antenna branches such that only one of said transmit antenna branches is active at a given time, wherein said active transmit antenna branch transmits said long training sequence with an increased power level relative to a transmission of a payload by said active transmit antenna branch.

2. The method of claim 1, wherein said increased power level for said active transmit antenna branch compensates for said inactive transmit antenna branches being silent during said given time.

3. The method of claim 1, wherein said active transmit antenna branch provides approximately the same antenna power while transmitting said long training sequence as a total power of said plurality of transmit antenna branches during a transmission of said payload.

4. The method of claim 1, wherein said increased power level is provided by a digital-to-analog converter associated with said active transmit antenna branch.

5. The method of claim 1, further comprising the step of applying a digital code corresponding to a binary value of zero to one or more digital-to-analog converters associated with said inactive transmit antenna branches.

6. The method of claim 1, further comprising the step of applying a digital code associated with said long training sequence to one or more digital-to-analog converters associated with said active transmit antenna branch.

7. The method of claim 1, wherein each of said inactive transmit antenna branches has a power level below a predefined threshold.

8. A transmitter in a multiple antenna communication system, comprising:
   a plurality of transmit antenna branches for transmitting a long training sequence such that only one of said transmit antenna branches is active at a given time, wherein said active transmit antenna branch transmits said long training sequence with an increased power level relative to a transmission of a payload by said active transmit antenna branch.

9. The transmitter of claim 8, wherein said increased power level for said active transmit antenna branch compensates for said inactive transmit antenna branches being silent during said given time.

10. The transmitter of claim 8, wherein said active transmit antenna branch provides approximately the same antenna power while transmitting said long training sequence as a total power of said plurality of transmit antenna branches during a transmission of said payload.

11. The transmitter of claim 8, wherein said increased power level is provided by a digital-to-analog converter associated with said active transmit antenna branch.

12. The transmitter of claim 8, further comprising a digital signal processor for applying a digital code corresponding to a binary value of zero to one or more digital-to-analog converters associated with said inactive transmit antenna branches.

13. The transmitter of claim 8, further comprising a digital signal processor for applying a digital code associated with said long training sequence to one or more digital-to-analog converters associated with said active transmit antenna branch.

14. The transmitter of claim 8, wherein each of said inactive transmit antenna branches has a power level below a predefined threshold.

15. A digital signal processor for a multiple antenna communication system, comprising:
   a memory and
   at least one processor, coupled to the memory, operative to:
   generate a long training sequence for transmission on a plurality of transmit antenna branches such that only one of said transmit antenna branches is active at a given time, wherein said long training sequence is transmitted by said active transmit antenna branch with an increased power level relative to a transmission of a payload by said active transmit antenna branch.

16. The digital signal processor of claim 15, wherein said increased power level for said active transmit antenna branch compensates for said inactive transmit antenna branches being silent during said given time.

17. The digital signal processor of claim 15, wherein said active transmit antenna branch provides approximately the same antenna power while transmitting said long training sequence as a total power of said plurality of transmit antenna branches during a transmission of said payload.

18. The digital signal processor of claim 15, wherein said increased power level is provided by a digital-to-analog converter associated with said active transmit antenna branch.

19. The digital signal processor of claim 15, wherein said processor is further operative to apply a digital code corresponding to a binary value of zero to one or more digital-to-analog converters associated with said inactive transmit antenna branches.

20. The digital signal processor of claim 15, wherein said processor is further operative to apply a digital code associated with said long training sequence to one or more digital-to-analog converters associated with said active transmit antenna branch.

* * * * *

UNITED STATES PATENT AND TRADEMARK OFFICE
CERTIFICATE OF CORRECTION

| | | |
|---|---|---|
| PATENT NO. | : 7,742,770 B2 | Page 1 of 1 |
| APPLICATION NO. | : 11/388294 | |
| DATED | : June 22, 2010 | |
| INVENTOR(S) | : Edward E. Campbell | |

It is certified that error appears in the above-identified patent and that said Letters Patent is hereby corrected as shown below:

In claim 9, column 9, line 5, "inactive" should be replaced by -- active --.

Signed and Sealed this
Eighteenth Day of December, 2012

David J. Kappos
*Director of the United States Patent and Trademark Office*